United States Patent Office 3,499,756
Patented Mar. 10, 1970

3,499,756
RECOVERY OF METALLIC TIN FROM AQUEOUS SOLUTION OF TIN SALT
Edward F. Fitzhugh, Jr., Cleveland Heights, Ohio, and Don C. Seidel, Golden, Colo., assignors to Republic Steel Corporation, Cleveland, Ohio, a corporation of New Jersey
No Drawing. Filed Apr. 6, 1967, Ser. No. 628,838
Int. Cl. C22b 25/04, 3/00
U.S. Cl. 75—109                                    9 Claims

ABSTRACT OF THE DISCLOSURE

This invention comprises a process for the recovery of metallic tin from an aqueous solution containing a tin salt. The tin is precipitated by the addition of metallic iron to the solution under appropriate temperature and acid conditions. Preferred conditions are a ratio of 2–3.5 moles of iron per mole of contained tin, a pH in the starting solution of 1.4–1.6, and a temperature of at least 100° C.

---

This invention relates to the recovery of tin from a corresponding salt solution. More particularly this invention relates to a process for the precipitation of metallic tin from a solution containing a tin salt, effected by the addition of metallic iron under specific temperature and acid conditions.

Tin is found in certain ores or in the tailings from ores from which other metals have been leached or otherwise recovered. In other cases waste leach solutions are available which contain tin salts in relatively small amounts. In view of the low percentage of tin in particular ores or because of the low concentration in certain leach solutions, it is very often not profitable to recover such values. In such cases, the recovery of this metal would be of considerable interest if an inexpensive, simple method was available for economical recovery of such metal values.

In accordance with the practice of this invention, it has now been found that tin can be recovered from aqueous solutions containing a tin salt, either in dilute or concentrated form, by the addition of controlled amounts of metallic iron at appropriate temperatures and acid conditions.

In general a ratio of at least one mole of metallic iron per mole of tin contained in the solution, preferably 2–3.5 moles of iron per mole of tin, effects precipitation of the tin. Excessive amounts of iron are not desirable since the excess iron produces a lower grade of recovered tin.

The solution of the metal salt advantageously has a pH at the start in the range of 1.4–1.6. The use of a more acidic solution means merely that more iron is dissolved to bring the solution into the desired pH range for effective precipitation. A higher pH in the starting solution will not defeat that precipitation of the metal but is less advantageous in that insufficient iron is sometimes dissolved to effect the maximum precipitation of the tin. Moreover, the use of a higher initial pH generally results in a somewhat lower product grade. In any case, the initial pH should not be breater than 5, preferably no greater than 3.5. In general, the final pH or pH after precipitation of the tin, is in the range of about 2.5–5.

For the purpose of precipitating metallic tin in accordance with this invention, the temperature is advantageously at least 100° C., advantageously in the range of 100–200° C., and preferably 115–150° C. While the temperature can be even higher than 200° C., there is no advantage in exceeding this temperature and unnecessary heating costs are introduced. At temperatures below 100° C., the precipitation is much less effective in that a lower percentage of the contained tin is thereby precipitated.

The process of this invention is effected in a closed vessel for several reasons. First, the reaction is desirably maintained under pressure to avoid vaporization and thereby to permit the higher temperatures desired. Secondly, hydrogen is generated by the reaction of the iron with acid in the solution and it is found most advantageous to retain this hydrogen in contact with the solution in order to produce the most effective results. If the hydrogen is allowed to escape, the precipitation is less efficient than in cases where a partial pressure of hydrogen is maintained.

In preparing such solutions it is generally desirable to chloridize a tin bearing material with hydrochloric acid or by a chloridizing roast. This is performed according to known techniques.

In accordance with this invention, the tin can be substantially completely recovered from the solution, with recoveries of 90–99% being relatively easily effected.

The particle size of the iron used has an effect in that the reaction between iron and the salt solution is a surface reaction. Therefore, all other facts being equal, the production rate generally increases with smaller particle size because of the greater area persented. Reaction takes place even with large particles of iron but at a slower rate. An advantageous particle size is found to be less than 100 mesh. In addition to particle size, there are other characteristics, such as purity and carbon content of the iron which affect reaction rate. Low carbon iron powder is preferred for this purpose.

Where reference is made to moles of iron per mole of Sn, this is calculated on the basis of metal in the metallic state regardless of the tin being in compound form. In other words, moles of iron per mole of tin is equivalent to atoms of iron per atom of tin.

Where is may be desirable to have a purer grade of tin precipitated, it may be preferred to add less than the amount of iron that will effect complete precipitation of the desired metal values in the solution. In such case, the filtrate after removal of the initial precipitate, can be further treated with iron to effect more complete removal of the desired metallic values. However, the second precipitate will be of much poorer grade than the first precipitate because of the excess iron which remains undissolved in the solution.

Although chloridizing with hydrochloric acid or by roasting with sodium chloride is generally the method used in preparing the tin salt solution, it is also possible to practice the process of this invention on solutions which contain tin in other halide forms such as bromide, iodide and fluoride. While the tin is advantageously in a lower valency state such as in stannous chloride, it is also satisfactory to start with stannic halides although larger amounts of iron are required for reduction to the metallic state. As previously indicated, the amount of iron used is also dependent on the concentration of the tin in the salt solution.

The invention is best described by the following examples. These examples are presented merely for purpose of illustration and are not intended in any way to limit the scope of the invention, nor the manner in which it can be practiced. Unless specifically indicated otherwise, parts and percentages are given by weight. In the following examples, the experiments are performed in a 2-liter autoclave reactor having a double impellor. The reactor is a standard one commercially, available as Parr 2-L Reactor and having a titanium surface in the areas that will be wetted. The recovery of the precipitate is facilitated by using a glass liner, but the reactor solution can be directly in contact with the titanium. It is often desirable to bleed some of the steam from the reactor at an early stage to sweep out the initially contained air and thereby provide a more reducing atmosphere.

Example I

One liter of an aqueous acidic stannous chloride solution containing 2 grams/liter of tin is placed in the 2-liter autoclave described above. To this starting solution, which has a pH of 1.6, is added 2.82 grams of finely divided low carbon iron. This iron addition is equivalent to 3 moles of Fe for each mole of Sn in solution. The autoclave is closed and with sufficient agitation to keep the iron powder in suspension, the temperature is raised to and maintained at approximately 150° C. for 60 minutes. The resultant solids are recovered by filtration to give a tin-iron powder having a tin content of 58.8% with the balance being primarily iron and some iron-tin compounds. The tin precipitated represents 99.6% of the original tin in solution.

Example II

To illustrate the critical effect of temperature in the process of this invention, a series of experiments are performed using the procedure of Example I. In each test the procedure is the same as that for Example I except that the reaction temeperature is different in each case, having the respective values of 25° C., 80° C., 100° C., 115° C., 135° C., 150° C. and 160° C. Optimum recoveries are achieved at temperatures in the range of 115–150° C., and represent 98 to 99.5% of the tin in the solution.

Example III

To illustrate the effect of the amount of iron added, a series of experiments are performed using the procedure of Example I. In each test the starting solution contains 2 grams/liter of Sn, the starting pH is 1.6, the reaction temperature is approximately 150° C., and the reaction time is 60 minutes. In these tests, the iron addition is varied using 1.8, 1.95, 2.25, 2.7 and 3.0 moles of Fe respectively per mole of Sn in solution. The results show that for these particular conditions the recovery approaches 100% as the iron addition approaches 3 moles of Fe for each mole of Sn in the starting solution.

Example IV

The procedures of Examples I–III are repeated a number of times using equivalent amounts of the corresponding bromide, iodide and fluoride salts of tin. In each case satisfactory precipitations are obtained.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process for the separation of tin from an aqueous solution having a maintained pH of 1.4–5, said solution being in a closed vessel and containing at least one inorganic tin halide compound comprising the steps of:
   (a) adding to said solution at least one mole of metallic iron per mole of tin;
   (b) maintaining a temperature of at least 115° C.;
   (c) continuing the resultant reaction until a substantial amount of tin has been precipitated from said solution; and
   (d) thereafter separating said precipitate from said solution, and thereby recovering substantially all of the tin originally in said solution.

2. The process of claim 1 in which said tin halide compound is a tin chloride.

3. The process of claim 2 in which said temperature is in the range of 115° C. to 150° C.

4. The process of claim 2 in which said salt is stannous chloride.

5. The process of claim 1 in which said acidic solution has a pH no greater than 3.5.

6. The process of claim 2 in which said acidic solution has a pH no greater than 3.5.

7. The process of claim 2 in which said iron is in a finely divided state.

8. The process of claim 7 in which said iron is used in an amount of 2–3.5 moles per mole of tin in said solution.

9. A process for the separation of tin from an aqueous acidic solution hvaing a maintained pH of 1.4–5, said solution being in a closed vessel and containing an inorganic tin chloride, comprising the steps of:
   (a) adding 2–3.5 moles of finely divided iron per mole of tin in said solution;
   (b) maintaining the liquid solution at a temperature in the range of 115° C. to 150° C.;
   (c) continuing the resultant reaction until a substantial amount of tin has been precipitated from said solution; and
   (d) thereafter separating said precipitate from said solution, and thereby recovering substantially all of the tin originally in said solution.

References Cited

UNITED STATES PATENTS

| | | | |
|---|---|---|---|
| 2,082,487 | 6/1937 | Frick | 23—98 XR |
| 2,357,429 | 9/1944 | Saxer et al. | 23—98 XR |
| 3,053,621 | 9/1962 | Horvitz | 23—98 |
| 3,161,465 | 12/1964 | Horn et al. | 23—98 |
| 3,194,653 | 7/1965 | Keyes | 75—109 |

FOREIGN PATENTS

| | | |
|---|---|---|
| 78,647 | 12/1954 | Denmark. |

EDWARD STERN, Primary Examiner

U.S. Cl. X.R.

23—88, 98